United States Patent [19]

Burkhardt

[11] 4,168,133

[45] Sep. 18, 1979

[54] FEEDING STATION FOR A SORTING CONVEYOR

[75] Inventor: Gisbert Burkhardt, Reichenau, Fed. Rep. of Germany

[73] Assignee: Licentia Patent-Verwaltungs-G.m.b.H., Frankfurt, Fed. Rep. of Germany

[21] Appl. No.: 862,601

[22] Filed: Dec. 20, 1977

[30] Foreign Application Priority Data

Dec. 27, 1976 [DE] Fed. Rep. of Germany ....... 2659002

[51] Int. Cl.[2] .............................................. B65G 43/00

[52] U.S. Cl. .................................... 414/134; 198/357; 198/448

[58] Field of Search ............ 214/1 M, 11 R; 198/356, 198/357, 358, 448, 449, 466, 469, 470, 572, 576, 857, 577; 209/DIG. 1

[56] References Cited

U.S. PATENT DOCUMENTS

| | | | |
|---|---|---|---|
| 3,747,781 | 7/1973 | Daigle et al. .................. | 214/11 R X |
| 3,982,625 | 9/1976 | Wentz et al. .................... | 198/577 X |

FOREIGN PATENT DOCUMENTS

| | | |
|---|---|---|
| 899174 | 12/1953 | Fed. Rep. of Germany . |
| 929900 | 7/1955 | Fed. Rep. of Germany . |

*Primary Examiner*—Robert G. Sheridan

*Attorney, Agent, or Firm*—Spencer & Kaye

[57] ABSTRACT

A sorting conveyor for flat rectangular items has a guide surface extending in a conveying direction; a drive continuously moving along the guide surface in the conveying direction; a plurality of pusher fingers attached in a spaced relationship to the drive for individually engaging and serially conveying the items along the guide surface in the conveying direction; and at least one feeding station operatively coupled to the sorting conveyor for introducing items thereinto. Each feeding station comprises a feeding panel disposed laterally of the guide surface for receiving the items to be introduced into the sorting conveyor; a feeding conveyor arranged in the zone of the feeding panel for advancing each item onto the guide surface such that a lower, support edge of the advanced item forms an acute angle with the guide surface and a leading edge of the advanced item is substantially parallel to the guide surface and perpendicular to the conveying direction; and a control circuit connected to the feeding conveyor and including sensors and signaling arrangements generating output signals for initiating a feeding cycle of the feeding conveyor at such a moment as to effect the introduction of each item from the feeding panel into an unoccupied conveying compartment defined between any two pusher fingers.

9 Claims, 4 Drawing Figures

FEEDING STATION FOR A SORTING CONVEYOR

BACKGROUND OF THE INVENTION

This invention relates to a sorting conveyor for advancing rectangular flat items such as letters. The items are individually advanced along a guide surface by pusher fingers which are attached to an endless, continuously running finger drive. There is further provided a feeding station or a plurality of serially arranged feeding stations for introducing the articles into the conveying track of the sorting conveyor.

A sorting conveyor of the above-outlined type is disclosed, for example, in German Pat. No. 899,174. The conveying track is formed of an inclined lateral guide surface, a support surface for engaging the lower edge of the flat items and pusher fingers attached to a continuously driven endless chain. The items to be distributed are deposited at the feeding station or feeding stations manually directly on the guide surface. Simultaneously, with the aid of a keyboard, a destination signal is applied to a synchronously switched companion memory. The destination signal causes actuation of the respective diverter in the conveying path, thus effecting a separation (sorting) of the conveyed item at the desired location.

The above-outlined feeding step, however, requires substantial concentration on the part of the operating personnel to avoid incorrect depositions of items, particularly in case the conveying speed is increased. Consequently, such a feeding operation is practically not feasible in case several serially arranged feeding stations are present, because then additional care has to be taken to verify whether or not the next incoming conveying compartment defined between two successive pusher fingers and the corresponding portion of the companion memory has already been occupied at a preceding (upstream) feeding station.

German Pat. No. 929,900 discloses a conveyor for the upright conveying of rectangular flat items. The conveyor includes a feeding station which provides for a mechanical introduction of the items. In accordance with FIGS. 6 and 7 of that patent, the items are deposited from above into a trough-like channel from which, at a desired moment, they are introduced laterally into the conveying track at an acute angle by means of a pair of pinch rollers driven with a speed adapted to the conveying speed. A feeding station constructed in this manner, however, would not be adapted for use in a sorting conveyor to which the invention relates because in case of a conveying track including pusher fingers, the introduction of items may take place only at predetermined moments. Further, all feeding stations operating with a trough-like feed channel for sorting flat items have the disadvantage that subsequent to the deposition of the item, markings thereon, such as an address, are no longer visible.

SUMMARY OF THE INVENTION

It is an object of the invention to provide a sorting conveyor of the above-outlined type which provides for the introduction of the items in an operationally advantageous manner, wherein the markings on the items remain visible after introduction and wherein the feeding operation (that is, the introduction of articles into the conveying track) is effected substantially in an automatic manner.

This object and others to become apparent as the specification progresses, are accomplished by the invention, according to which, briefly stated, the sorting conveyor for flat rectangular items has a guide surface extending in a conveyor direction; a drive continuously moving along the guide surface in the conveying direction; a plurality of pusher fingers attached in a spaced relationship to the drive for individually engaging and serially conveying the items along the guide surface in the conveying direction; and at least one feeding station operatively coupled to the sorting conveyor for introducing items thereinto. Each feeding station comprises a feeding panel disposed laterally of the guide surface for receiving the items to be introduced into the sorting conveyor; a feeding conveyor arranged in the zone of the feeding panel for advancing each item onto the guide surface such that a lower, support edge of the advanced item forms an acute angle with the guide surface and a leading edge of the advanced item is substantially parallel to the guide surface and perpendicular to the conveying direction; and a control circuit connected to the feeding conveyor and including sensors and signalling arrangements generating output signals for initiating a feeding cycle of the feeding conveyor at such a moment as to effect the introduction of each item from the feeding panel into an unoccupied conveying compartment defined between any two pusher fingers.

DESCRIPTION OF THE PREFERRED EMBODIMENT

Figure 1:
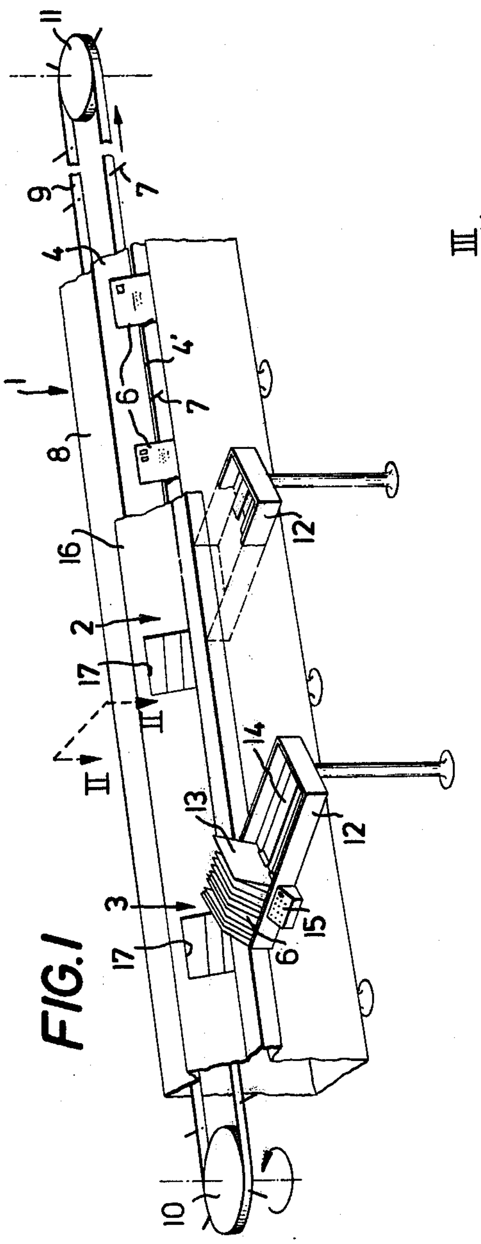
FIG. 1 is a schematic perspective view of a length portion of a sorting conveyor showing two feeding stations.

Turning now to FIG. 1, the sorting conveyor illustrated therein shows a conveying track generally indicated at 1, as well as two feeding zones 2 and 3 where flat items are introduced into the conveying track.

The conveying track 1 comprises a guide surface 4 which is inclined to the vertical and which is adjoined at the lower edge by a support surface 5' (hidden from view in FIG. 1, but visible in FIGS. 2–4) for engaging the lower edge of flat, rectangular items (such as letters) 6 to be sorted. The conveying track 1 further has pusher fingers 7 which project into the conveying path through a longitudinal slot 4' provided in the guide surface 4. The guide surface 4 continues, at its upper edge, in a horizontally oriented closure plate 8. The pusher fingers 7 are secured to a continuously driven endless belt 9 which is arranged behind the guide surface 4 (as viewed in FIG. 1) and which is trained about a drive pulley 10 and a support pulley 11. The pusher fingers 7 travel and the guide surface 4 is oriented in a conveying direction.

In each feeding zone 2 and 3 there is positioned a platform 12 for receiving a stack of flat items 6. The stack is supported by an upright plate 13 which, dependent upon the removal of items from the platform 12, is moved in a feeding direction automatically by means of belts 14. A keyboard 15 secured to each platform 12 serves for applying destination signals based, for example, on the information contained in the addresses or zip codes noted on the flat items. Underneath a shroud plate 16 in which inlet openings 17 associated with the feeding zones 2 and 3 are provided, there are arranged mechanical devices forming part of the feeding assemblies constituting the individual feeding stations which are associated with the feeding zones and which will be described in more detail below.

The attendant who is seated at the platform 12 and who prepares the distribution (sorting) of the items, removes the leading item 6 from the item stack with the left hand and introduces it into the opening 17. At the same time, he reads the address or zip code marked on the item and applies, with the right hand, the corresponding destination code to the keyboard 15. Thereafter, as will be described below, at the proper moment, the item 6 is automatically introduced into the conveying track 1, and a shifting of the destination signal in a companion memory is initiated.

Figure 2:
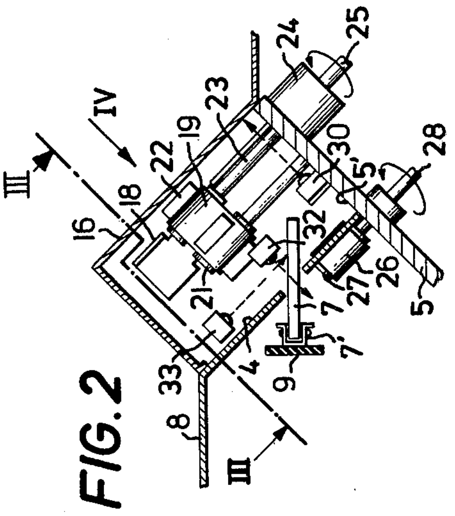
FIG. 2 is a schematic cross-sectional view of a preferred embodiment of the invention taken along plane II shown in FIG. 1.
Figure 3:
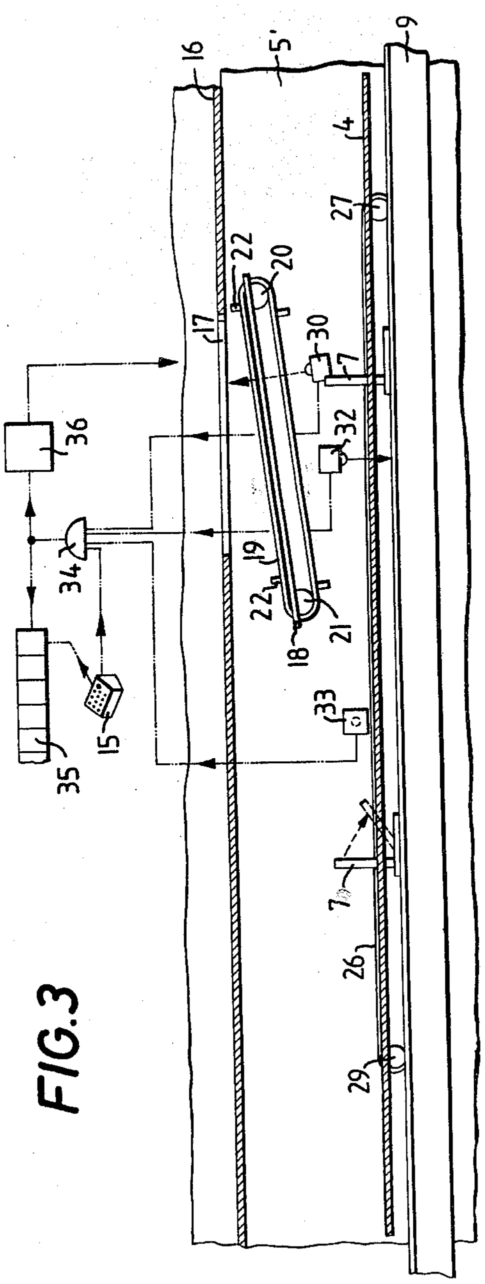
FIG. 3 is a sectional view taken along line III of FIG. 2.
Figure 4:
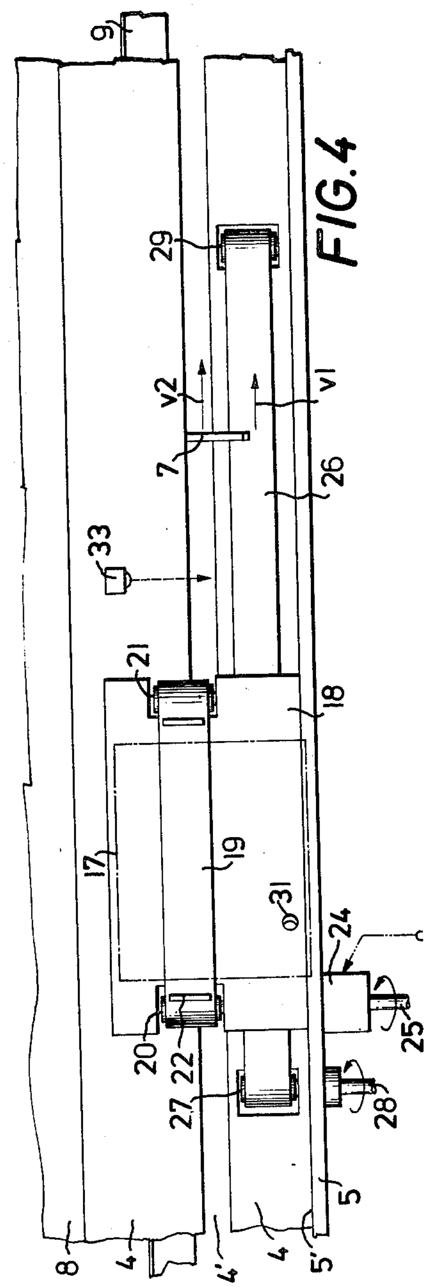
FIG. 4 is a view of the preferred embodiment (with the lid removed) in the direction of arrow IV of FIG. 2.

Turning now to FIGS. 2, 3 and 4, in the feeding zones 2 and 3 the support surface 5' on which the flat items stand with their lower edge, is formed by an inclined base plate 5. For receiving the items introduced through the opening 17, each feeding station has, laterally adjacent the guide surface 4, a plate member secured to the base plate 5 which, together with the support surface 5' forms a feeding panel 18. Advantageously, although not necessarily, the surface of the feeding panel 18 defines an acute angle with the guide surface 4. On the feeding panel 18 there is arranged and advanced a conveyor belt 19 which is guided about a drive pulley 20 and a support pulley 21 and to which there are affixed four transverse pusher strips 22. The shaft 23 of the drive pulley 20 is connectable to a continuously driven shaft 25 by means of a magnetic clutch 24.

Upon energization of the magnetic clutch 24, the conveyor belt 19 moves, together with the pusher strips 22, on the feeding panel 18 towards the right (as viewed in FIGS. 2 and 3), so that a flat item deposited on the feeding panel 18 is advanced in the feeding direction towards the guide surface 4 at an acute angle with respect thereto. The feeding direction is parallel to the above-noted lower edge of the item. This lower edge is a support edge with which the item engages the support surface 5' of the feeding panel 18. During advance of the item along the feeding panel 18, the leading edge of the item is parallel to the guide surface 4 and perpendicular to the traveling direction of the pusher finger 7.

In accordance with a further advantageous feature, with each feeding station there is associated a conveyor belt 26 which is advanced on the guide surface 4 and on which there are positioned the flat items advanced from the feeding panel 18. The belt 26 is trained about a drive roller 27 having a continuously driven shaft 28 and a support roller 29. The speed v1 of the conveyor belt 26 is approximately 10–30% less than the conveying speed v2 of the pusher fingers 7. Advantageously, that side of the conveyor belt 26 which is oriented towards the items has high frictional properties. The purpose of the conveyor belt 26 is to ensure that the introduced items are, substantially independently of their dimensions, brought into engagement with the successive pusher finger 7 with a predetermined small relative speed. In this manner, there is prevented damage to the trailing edge of the more delicate items and further there is prevented an undesirable pivoting of the pusher finger 7 rearwardly, in case—as indicated in FIG. 3 at the right-hand side with dashed lines and in FIG. 2—they can be pivoted outwardly for checking malfunctions (for example, they are movably supported in housings 7' attached to the belt 9).

For the automatic control of the operation relating to the introduction of the items at the feeding stations there is provided a control circuit including three light barriers. A first light barrier 30 monitors, via an opening 31 provided in the feeding panel 18, the presence or absence of an item and emits a logic "1" if such presence exists. A second light barrier 32 monitors the throughgoing conveying track and transmits a logic "1" if no item is present upstream of the successive pusher finger 7. A third light barrier 33 monitors the position of the pusher finger 7 and transmits a logic "1" in case a pusher finger 7 is at a location predetermined by the position of the light barrier 33. The output signals of the light barriers 30, 32 and 33 are applied to corresponding inputs of an AND-gate 34 (also forming part of the control circuit) by means of conductors shown in dash-dotted lines.

By means of the keyboard 15, connected to the control circuit, there is generated a côde signal which characterizes the destination of the item introduced through the opening 17 and which is applied to the input of a companion memory (shift register) 35 but which, at this point, is not yet set by the code signal. Further, an electronic component connected to the keyboard 15 generates an output signal which corresponds to a logic "1" upon application of a complete destination signal by the keyboard 15. The output signal of the electronic component is applied to a fourth imput of the AND-gate 34.

The output of the AND-gate 34 is connected with the enabling input of the companion memory 35 and the input of a switching stage 36 which controls the energization of the magnetic clutch 24. In case the output signal of the AND-gate 34 corresponds to a logic "1", the code signal carried by the companion memory 35 sets the latter for further signal shifting and also, the switching stage 36 is activated which, in cooperation with the magnetic clutch 24 and a rest position (parking) switch (not shown) initiates a driving operation, by means of which the conveyor belt 19 is displaced by one-half of its circumferential length (one feeding cycle) whereby the item 6 is fed along the feeding panel 18 onto the guide surface 4. The speed of this displacement may approximately correspond to the conveying velocity v2 of the pusher fingers 7.

The above-described arrangement of the control means for the sorting conveyor provides that subsequent to depositing an item on the feeding panel 18 and subsequent to applying the complete destination signal by means of the keyboard 15, there is automatically initiated a driving operation for moving the pusher strips 22 (by moving the conveyor belt 19) of the respective feeding station at such a moment that the item is introduced into a still-unoccupied conveying compartment defined between two successive pusher fingers 7. At the same time, a further shifting of the associated destination signal is initiated in the companion memory.

It will be understood that the above description of the present invention is susceptible to various modifications, changes and adaptations and the same are intended to be comprehended within the meaning and range of equivalents of the appended claims.

What is claimed is:

1. In a sorting conveyor for flat rectangular items, including a guide surface extending in a conveying direction; a first drive means continuously moving along the guide surface in the conveying direction; a plurality of pusher fingers attached in a spaced relationship to the first drive means for individually engaging and serially conveying the items along the guide surface in the conveying direction; any two consecutive pusher fingers defining, between themselves, a continuously moving conveying compartment; at least one feeding station operatively coupled to the sorting conveyor for introducing items thereinto; the improvement wherein each feeding station comprises (a) a feeding panel disposed laterally of said guide surface for receiving the items to be introduced into said sorting conveyor;

(b) a feeding conveyor arranged in the zone of said feeding panel for advancing each item onto said guide surface in a direction parallel to a lower, support edge of the item; said feeding panel and said feeding conveyor being oriented such that each item is transferred to said guide surface in a position wherein the lower, support edge of the advanced item forms an acute angle with said guide surface and a leading edge of the advanced item is substantially parallel to said guide surface and perpendicular to said conveying direction;

(c) a second drive means for moving said feeding conveyor in successive feeding cycles; and (d) a control circuit means connected to said second drive means and including sensor means and signalling means for generating output signals for initiating each feeding cycle of said feeding conveyor for effecting the introduction of each item from said feeding panel into an unoccupied one of said conveying compartments.

2. A sorting conveyor as defined in claim 1, wherein said signalling means includes means for applying a destination signal to said control circuit for each item to be introduced at the feeding station into said sorting conveyor and wherein said control circuit further comprises a companion memory for receiving and further shifting the destination signal and means for effecting the further shifting of the destination signal simultaneously with the initiating of the respective feeding cycle.

3. A sorting conveyor as defined in claim 1, further comprising a conveyor belt arranged on said guide surface in the zone of said feeding panel and extending in said conveying direction and means for driving said conveyor belt in said conveying direction at a speed that is less than the speed of said pusher fingers.

4. A sorting conveyor as defined in claim 1, wherein said feeding panel is arranged at an acute angle with respect to said guide surface.

5. A sorting conveyor as defined in claim 4, wherein said feeding conveyor comprises endless moving means and spaced pusher elements attached to said endless moving means for engaging and advancing the items on said feeding panel towards said guide surface.

6. A sorting conveyor as defined in claim 5, wherein said endless moving means is constituted by an endless conveyor belt arranged on said feeding panel.

7. A sorting conveyor as defined in claim 1, wherein said sensor means includes (a) a first sensor monitoring said feeding panel and emitting a signal in response to the presence of an item on said feeding panel;

(b) a second sensor monitoring said guide surface and emitting a signal in response to the absence of an item in front of the pusher finger about to arrive in the effective zone of said feeding conveyor; and (c) a third sensor monitoring said guide surface and emitting a signal in response to the passage of each said pusher finger through a predetermined location which is past the effective zone of said feeding conveyor.

8. A sorting conveyor as defined in claim 7, wherein said control circuit further comprises an AND-gate having first, second and third inputs to which signals from the respective first, second and third sensors are applied and an output operatively connected with said second drive means for moving said feeding conveyor.

9. A sorting conveyor as defined in claim 8, wherein said AND-gate has a fourth input and wherein said signalling means includes means for applying a destination signal to said control circuit for each item to be introduced at the feeding station into said sorting conveyor and means for applying a ready signal to said control circuit upon completing the application of the destination signal; said control circuit further comprising a companion memory for receiving the destination signal; means for applying the ready signal to said fourth input of said AND-gate; and means for applying the signal at the output of said AND-gate to said companion memory for effecting the further shifting of the destination signal.

* * * * *